United States Patent
Marchlewski et al.

(10) Patent No.: US 10,427,614 B2
(45) Date of Patent: Oct. 1, 2019

(54) ARTICLE RACK ADAPTED FOR USE WITH PICKUP TRUCK

(71) Applicant: Ford Global Technologies, LLC, Dearborn, MI (US)

(72) Inventors: Jack Marchlewski, Saline, MI (US); Joshua Robert Hemphill, White Lake, MI (US); Dragan Stojkovic, Taylor, MI (US); Robert Reiners, Grosse Ile, MI (US); Jeffrey Gray, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 12 days.

(21) Appl. No.: 15/835,960

(22) Filed: Dec. 8, 2017

(65) Prior Publication Data
US 2019/0176714 A1  Jun. 13, 2019

(51) Int. Cl.
| B60R 9/00 | (2006.01) |
| B60R 9/06 | (2006.01) |
| B60R 9/02 | (2006.01) |
| B60R 9/10 | (2006.01) |
| B60R 11/00 | (2006.01) |

(52) U.S. Cl.
CPC ............... B60R 9/06 (2013.01); B60R 9/00 (2013.01); B60R 9/02 (2013.01); B60R 9/10 (2013.01); *B60R 2011/004* (2013.01); *B60R 2011/008* (2013.01)

(58) Field of Classification Search
CPC .... B60R 9/02; B60R 9/06; B60R 9/10; B60R 2011/004; B60R 2011/008
USPC ........................ 224/405, 282, 310, 502, 553
See application file for complete search history.

(56) References Cited

U.S. PATENT DOCUMENTS

| 5,255,951 A | 10/1993 | Moore, III |
| 5,303,858 A | 4/1994 | Price |
| 5,431,472 A | 7/1995 | Coffland |
| 5,699,945 A | 12/1997 | Micklish |
| 7,584,975 B2 * | 9/2009 | Leitner ...................... B60R 3/02 280/163 |
| 8,251,178 B2 * | 8/2012 | Krobot ...................... B60R 3/02 182/127 |
| 8,820,811 B1 * | 9/2014 | Hemphill .................. B60R 9/00 248/222.52 |
| 9,290,130 B2 * | 3/2016 | Buller ...................... B60R 9/042 |
| 2003/0189075 A1 * | 10/2003 | Laverack .................. B60R 9/10 224/571 |

* cited by examiner

*Primary Examiner* — Adam J Waggenspack
(74) *Attorney, Agent, or Firm* — Vichit Chea; Brooks Kushman P.C.

(57) ABSTRACT

An article rack includes a base mountable to a top rail of a truck box, a carrier, and a linkage pivotally connected to the base and the carrier. A drive mechanism of the rack has a first wheel fixed to the base, a second wheel fixed to the carrier, and an endless loop trained around the wheels such that pivoting of the linkage about the base pivots the carrier about the linkage.

20 Claims, 4 Drawing Sheets

US 10,427,614 B2

ARTICLE RACK ADAPTED FOR USE WITH PICKUP TRUCK

TECHNICAL FIELD

The present disclosure relates to pickup-truck accessories and more particularly to an article rack configured to be mounted on a box of pickup truck.

BACKGROUND

Aftermarket accessories are available for pickup trucks to transport different types of articles. Aftermarket bicycle racks are one common accessory. Bicycle racks allow customers to attach bicycles to a vehicle for easier transport. Some aftermarket bicycle racks include a portion that supports the bicycles and a portion that mounts to a trailer-hitch receiver. These aftermarket bicycle racks prevent the rear hatch of the vehicle from opening when they are attached and tend to be bulky.

SUMMARY

According to one embodiment, an article rack includes a base mountable to a top rail of a truck box, a carrier, and a linkage pivotally connected to the base and the carrier. A drive mechanism of the rack has a first wheel fixed to the base, a second wheel fixed to the carrier, and an endless loop trained around the wheels such that pivoting of the linkage about the base pivots the carrier about the linkage.

According to another embodiment, an article rack includes an article support, a lifting mechanism, and a drive mechanism. The lifting mechanism has a base mountable to a sidewall, an intermediary, and an arm connected to the article support. The lifting mechanism is configured to move the article support between a raised transporting position that is above the sidewall and a lowered loading position that is adjacent an outside surface of the sidewall. The drive mechanism links the arm and the base such that pivoting the intermediary pivots the arm.

According to yet another embodiment, a bicycle rack for a pickup truck includes a base mountable to a side rail of a truck box and a bicycle carrier connected to the base by a linkage. The base, linkage, and carrier are pivotal relative to each other so that the carrier is movable between a transporting position in which the carrier is disposed over the base and a loading position in which the carrier is pivoted below the base.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
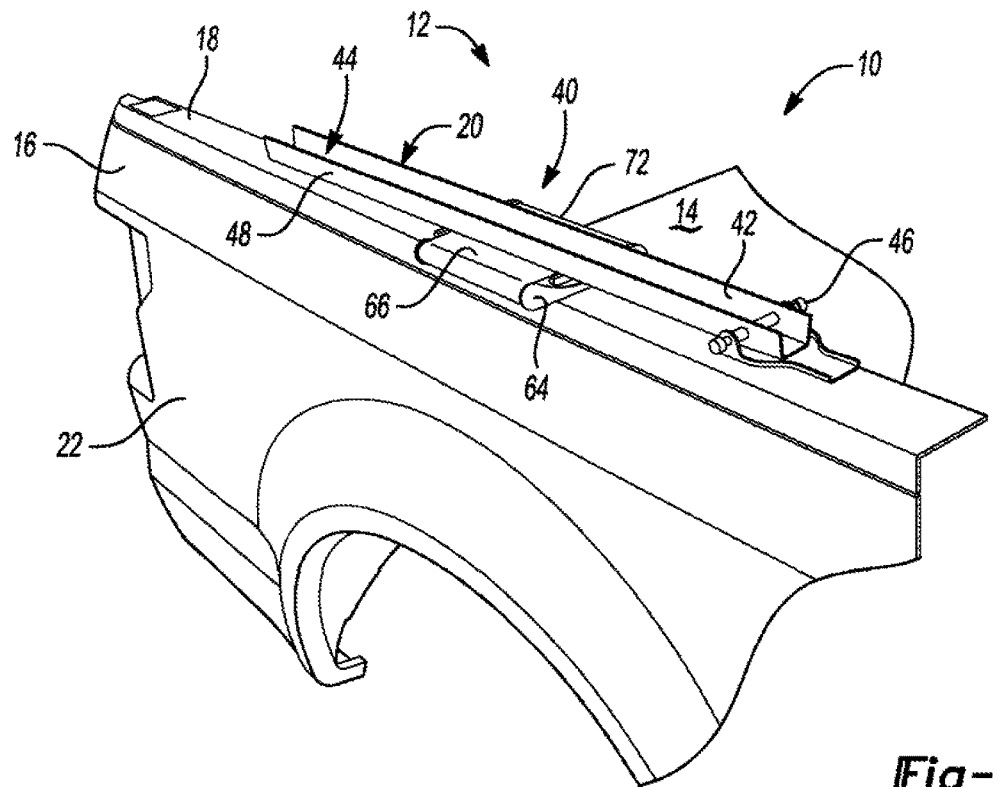
FIG. 1 is a perspective view an article rack attached to a pickup-truck box and shown in a loading position.
Figure 2:
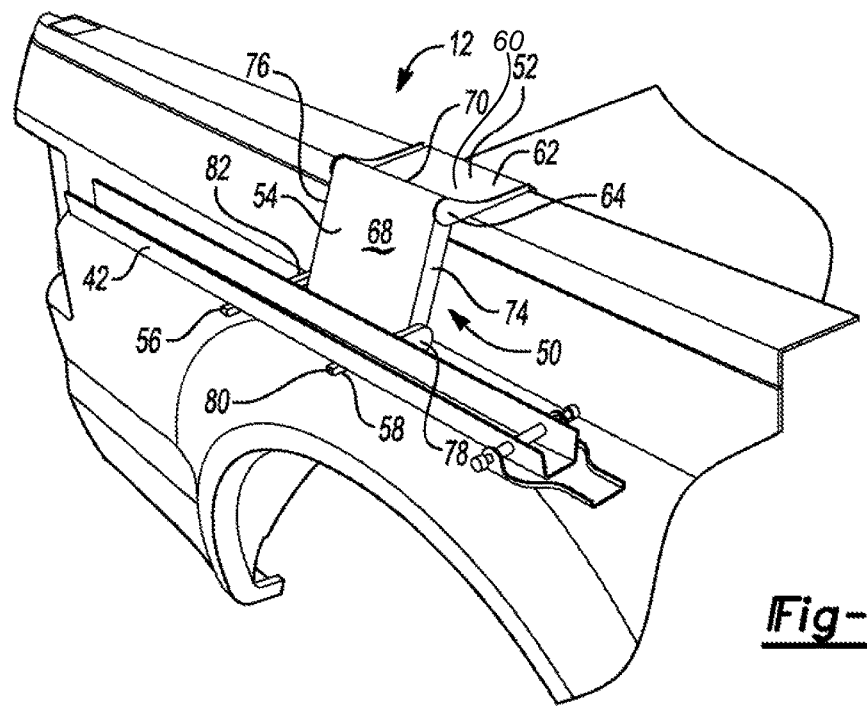
FIG. 2 is a perspective view of the article rack in a transporting position.

Referring to FIGS. 1 and 2, a pickup truck 10 may include a box 12 having a bed 14 and opposing first and second sidewalls 16. The first sidewall 16 may include a top rail 18, an inner panel 20, and an outer panel 22. The second sidewall may have a top rail, an inner panel, and an outer panel.

An article rack 40 is mountable to one of the sidewalls 16 and is used to transport items such as a bicycle, a ladder, and the like. The rack 40 may include an article support 42 that engages with the article to be transported. In the illustrated embodiment, the article support 42 is a rail having opposing sidewalls 48 that define a channel 44. The channel 44 receives the article and may include a pin 46 or other type of securing means to secure the item within the channel 44. The illustrated article rack 40 is specifically designed for transporting bicycles, and the channel 44 is sized and shaped to receive wheels of the bicycle therein. The pin 46 may extend through spokes of the wheel to secure the wheel in the channel 44. This disclosure contemplates other types of racks that are designed for transporting other types of cargo.

The article rack 40 may include a lifting mechanism 50 that connects between the article support 42 and the truck box 12. The lifting mechanism 50 is configured to articulate to move the article support 42 between the transporting position (FIG. 1) and the loading position (FIG. 2). In the transporting position, the article support 42 is disposed above the top rail 18. In the loading position, the article support 42 is lowered below the top rail 18 and adjacent to the outer panel 22 of the sidewall to enable easier loading of the article onto the article support 42.

The lifting mechanism 50 may include a base 52 mountable to the top rail 18, an intermediate linkage 54, and one or more arms pivotally attached to the linkage. In the illustrated embodiment, a pair of arms 56 and 58 are used. The base 52 may include a plate 60 disposed on the top rail 18 and a pair of side flanges 64 extending upwardly from a top side 62 of the plate and located on opposing sides of the plate 60.

The intermediate linkage 54 may be a rectangular body having a first face 66, a second face 68, and sidewalls 74, 76 extending therebetween. A first end 70 of the linkage 54 is pivotally attached to the side flanges 64 of the base 52. Spacing between the side flanges 64 may be greater than a width between the first sidewall 74 and the second sidewall 76 so that the intermediate linkage 54 is sandwiched between the side flanges 64. The linkage 54 may be pivotally connected to the base 52 by one or more pin members, e.g., an axle, that are received through openings defined in the side flanges 64 and the sidewalls 74, 76.

Each arm 56, 58 may include a proximal end 78, a distal end 80, and a mounting surface 82 extending therebetween. The proximal ends 78 are pivotally attached to a second end 72 of the linkage 54. The arms 56, 58 may be pivotally connected to the linkage 54 by one or more pin members that are received through openings defined in the sidewalls 74, 76 and the proximal ends 78.

The base 52, linkage 54, and arms 56, 58 are pivotally attached to each other allowing the lifting mechanism 50 to move between the transporting position, in which the linkage 54 is folded over the top side 62 of the plate 60 and the arms 56, 58 are folded to extend adjacent to the sidewalls 74, 76, and the loading position, in which the arms 56, 58 extend outwardly from the face 68 and the base 52 extends outwardly from the face 66.

The rack 40 is moved from the transporting position to the loading position by pivoting the intermediate linkage 54 away from the sidewall 16. The base 52 may be configured so that the pivot point between the base 52 and the linkage 54 is outboard of the outer panel 22 to prevent damaging the truck 10. Subsequently or simultaneously, the arms 56, 58 are pivoted about the linkage 54 until the arms are generally horizontal to the ground (assuming that the truck 10 is on flat ground) to place the article support 42 in an upright position. The lifting mechanism 50 may include stoppers that limit pivoting of the linkage 54 as well as the arms 56, 58. Pivoting of the linkage 54 may be limited to prevent the linkage 54 from pivoting into the sidewall 16. For example, a stopper may constrain pivoting of the linkage to 255 degrees which places the linkage at a 15 degree angle when in the loading position. Of course, other values may be chosen depending upon the design of the article rack as well as the geometry of the box 12. The rack 40 may be moved from the loading position to the transporting position by raising the article support 42 causing the linkage 54 to fold over the base 52 and the arms to pivot downward to place the article support 42 adjacent to the first face 66. A bottom of the article support 42 may rest on the first face 66 when in the transporting position.

Figure 3:
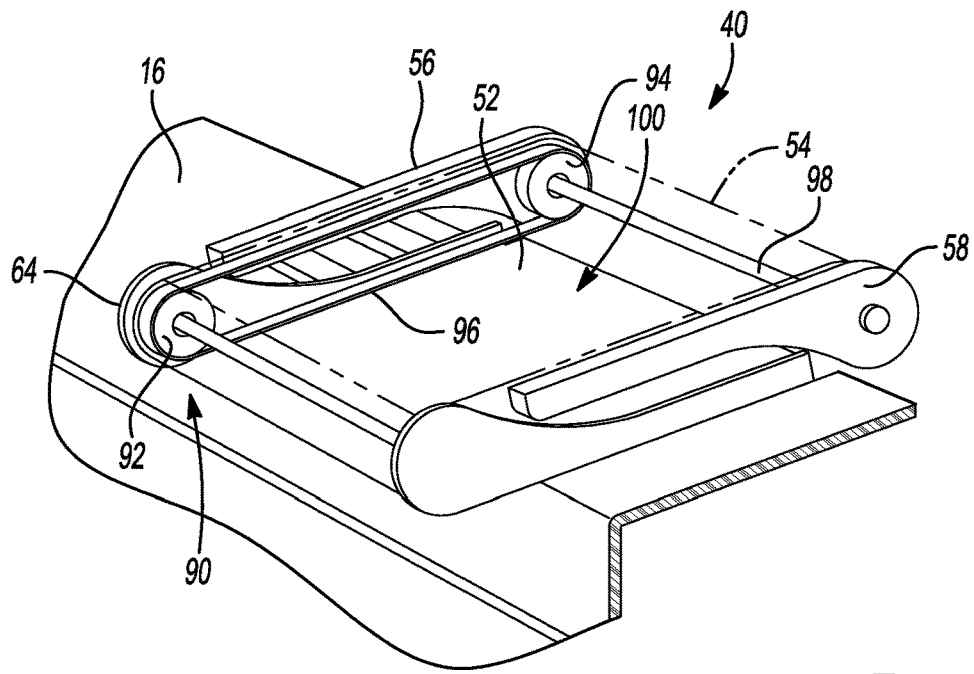
FIG. 3 is a perspective view of the article rack with the article support not shown for illustrative purposes and with the body of the intermediate linkage shown in phantom lines to illustrate the internals of the intermediate linkage.

Referring to FIG. 3, the article rack 40 may include a drive mechanism 90 that synchronizes pivoting of the linkage 54 and the arms 56, 58 so that the arms and linkage pivot a same amount. The drive mechanism 90 may also hold the arms 56, 58 in place when in the loading position to prevent the weight of the article rack (and its cargo) from pivoting the arms toward the ground. For example, if the linkage 54 pivots 255 degrees from the transporting position to the loading position, then the arms 56, 58 also pivot 255 degrees, which places the arms substantially horizontal to the ground (assuming that the truck 10 is on flat ground).

The drive mechanism 90 may be disposed in an interior 100 of the linkage 54 and include a first wheel 92 fixed to flange 64 of the base 52, a second wheel 94 fixed to the arm 56, and an endless loop 96 trained around the wheels 92, 94 such that pivoting of the linkage 54 about the base 52 pivots the arm 56 about the linkage 54. A first axle 98 may be fixed with at least one of the arm 56 and the wheel 92 and fixed with the arm 58 to pivot the arm 58 in unison with the arm 56. In this arrangement, the endless loop 96 rotates the wheel 94 clockwise to unfold the arms 56, 58 when the linkage 54 is pivoted counterclockwise. Similarly, the endless loop 96 rotates the wheel 94 counterclockwise to fold the arms 56, 58 in when the linkage 54 is pivoted clockwise. The drive mechanism 90 synchronizes movement of components of the lifting mechanism 50 facilitate moving the article support 42 between the loading position and the transporting position. Since the lifting mechanism 50 is synchronized by the drive mechanism 90, a user may grab any moving portion of the article rack 40 to move between the positions.

In one or more embodiments, the drive mechanism 90 is a chain drive in which the wheels 92 and 94 are sprockets and the endless loop 96 is a chain. Alternatively, the drive mechanism 90 may be a belt drive in which the wheels 92 and 94 are pullies and the endless loop 96 is a belt. The belt drive may be smooth belt, a V-belt, a ribbed belt, a cogged belt, or the like.

Figure 4:
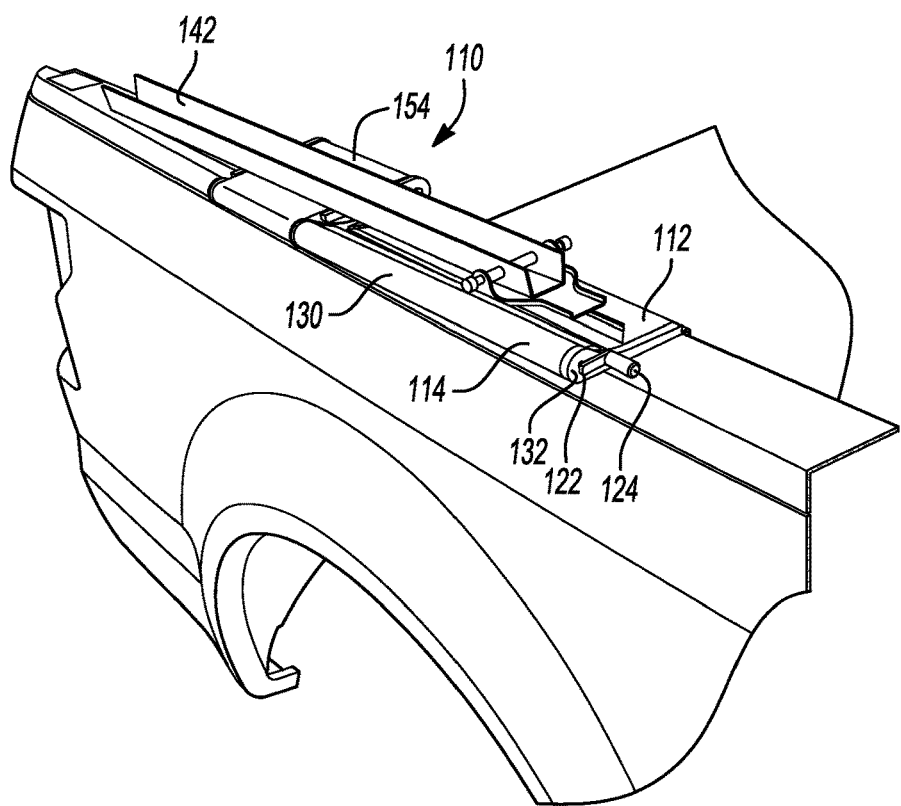
FIG. 4 is a perspective view of another article rack having a hand crank.
Figure 5:
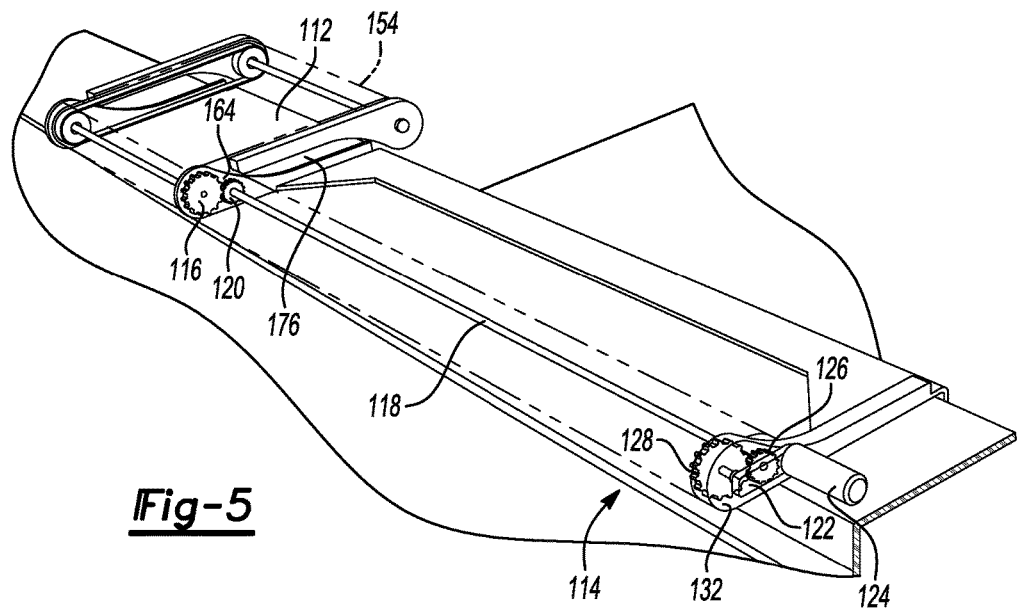
FIG. 5 is a perspective view of the another article rack with the bodies of the intermediate linkage and the actuator arrangement shown in phantom lines to illustrate the internals.

FIGS. 4 and 5 show an article rack 110 that has many common parts with article rack 40. (Parts common with rack 40 will have a callout number increased by one hundred and many of the common parts will not be discussed again here.) The article rack 110 includes a base 112 that has been elongated to support an actuator arrangement 114. The actuator arrangement 114 pivots the linkage 154 about the base 112 to move the article support 142 between the transporting position and the loading position. The actuator arrangement 114 may include a driveshaft 118 that is operably coupled to the linkage 154. For example, a pinion 120 is fixed to a distal end of the driveshaft 118 and engages with a gear 116 (e.g., a spur gear) supported adjacent to the side flange 164 and fixed to the sidewall 176 of the linkage 154. The gear 116 is larger than the pinion 120 to create a torque multiplication between the driveshaft 118 and the linkage 154. Rotation of the driveshaft 118 in the clockwise direction moves the article support 142 toward the loading position, and rotation of the driveshaft 118 in the counterclockwise direction moves the article support 142 towards the transporting position.

The actuator arrangement 114 may be manually operated by a crank assembly 122. The crank assembly 122 may be mounted to a third flange 132 of the base 112. The crank assembly 122 may include a handle 124 that is operably coupled to the driveshaft 118. For example, a pinion gear 126 is fixed on a proximal end of the driveshaft 118 and meshes with a spur gear 128 that is fixed to the handle 124. The gear 128 is larger than the pinion 126 to reduce cranking effort for the user. A cover 130 may encase the actuator arrangement 114 to hide and protect the drivetrain.

Figure 6:
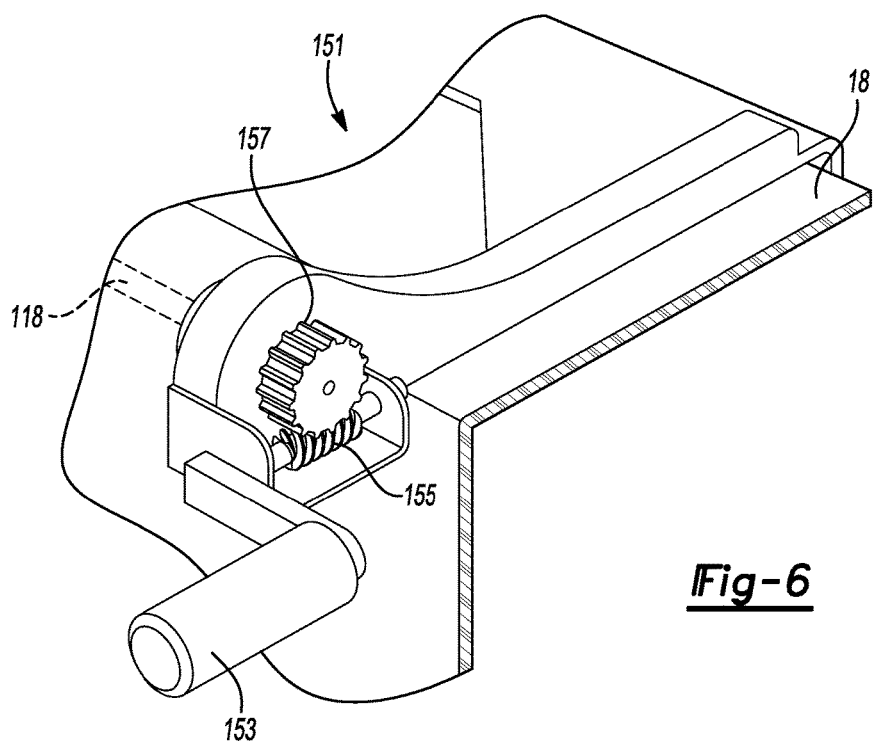
FIG. 6 is a perspective view of an alternative hand-crank assembly for the another article rack.

Referring to FIG. 6, another hand-crank assembly 151 includes a worm-gear arrangement that orients the handle 153 perpendicular to the top rail 18 so that the handle projects outwardly from the truck 10 making it easier to grab. The worm-gear arrangement includes a worm screw 155 extending from the handle 153 and a worm wheel 157 fixed to the driveshaft 118. The worm-gear arrangement may provide sufficient torque multiplication enabling the driveshaft to be directly connected with the linkage.

Figure 7:
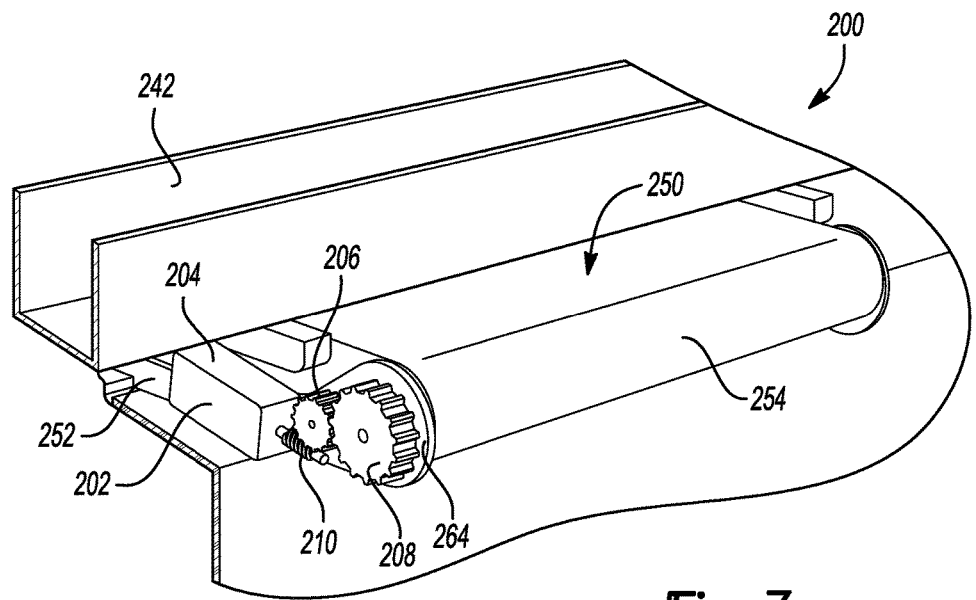
FIG. 7 is a perspective view of yet another article rack having an electric actuator arrangement.

FIG. 7 shows an article rack 200 that has many common parts with article rack 40. (Parts common with rack 40 will have a callout number increased by two hundred and many of the common parts will not be discussed again here.) An actuator arrangement 202 pivots the linkage 254 about the base 252 to move the article support 242 between the transporting position and the loading position. The actuator arrangement 202 may be electric and allows for remote operation from either a wired or wireless controller. Power may be supplied by the electrical system of the truck 10 or by a dedicated power source of the rack 200, e.g., a battery. The rack 200 may be electrically connected with the electrical system of the truck 10 via a trailer-hitch connector.

The actuator arrangement 202 may include an electric motor 204 that is mounted on the side flange 264. A driveshaft of the electric motor 204 is operably coupled to the linkage 254 enabling the electric motor 204 to actuate the lifting mechanism 250 to move the article support 242 between the transporting and loading positions. The driveshaft may be coupled to the linkage 254 by a worm-gear arrangement. For example, a worm screw 210 is fixed to the driveshaft and meshes with a worm wheel 206 supported on the side flange 264. The worm wheel 206 meshes with a gear 208 that is fixed to the linkage 254. Activation of the electric motor 204 rotates the gear 208 causing the linkage 254 to pivot relative to the base 252.

A user interface for operating the article rack 200 may be disposed on a portion of the base 252. For example, the user interface may include a first button that rotates the driveshaft in a first direction, and a second button that rotates the driveshaft in a second, opposite direction. The article rack 200 may include an associated key fob including buttons for operating the rack. The key fob may be used in conjunction with or in lieu of the user interface.

The base may be secured to the sidewall of the truck using a variety of different techniques. For example, the base may include clamps that engage with an underside of the top rail. Some trucks are equipped with anchor plates located on the inside surface of the sidewalls. The base may include brackets configured to connect with these anchor plates to secure the article rack on the sidewall of the truck.

Figure 8:
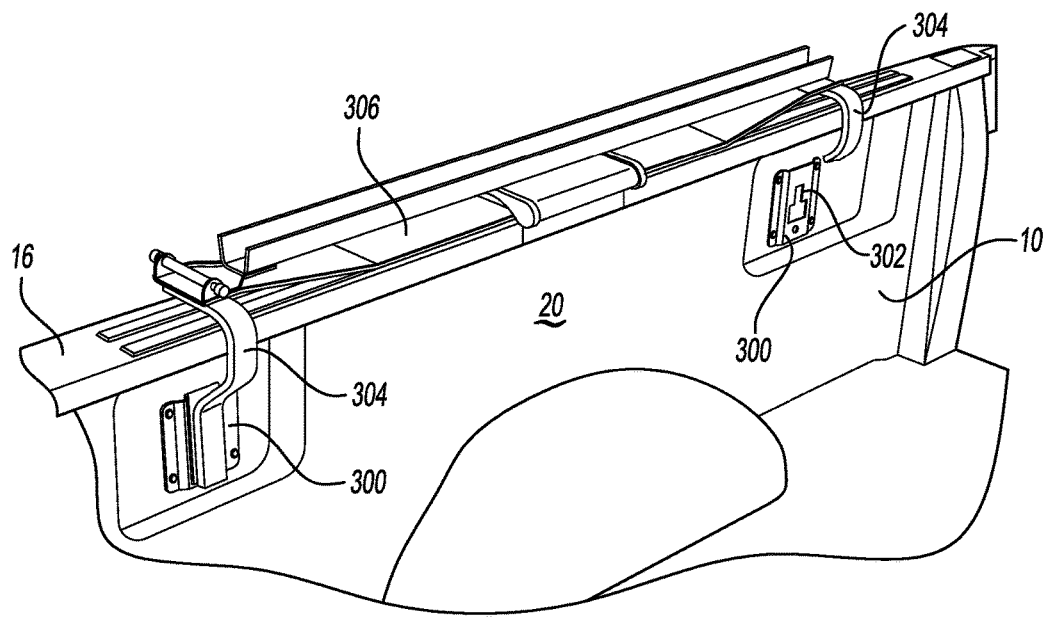
FIG. 8 is a perspective view of a mounting system for attaching an article rack to a pickup-truck box.

Referring to FIG. 8, the truck 10 may include anchor plates 300 disposed on the inner panel 20 of the sidewall 16. While not shown, additional anchor plates 300 may be disposed on the inner panel of the other sidewall. Each anchor plate 300 defines a slot 302 having a wider portion and a narrower portion. Brackets 304 connect between the base 306 of the article rack and the anchor plates 300. (The right bracket is fragmented to fully show the right anchor plate.) The brackets 304 include an insertion portion configured to be received within the slots 302 of the anchor plates 300. The insertion portion may be T-shaped having a head with a width narrower than the wider portion of the slot 302 and wider than the narrow portion of the slot 302. The brackets 304 are connected with the anchor plates 300 by inserting the head into the wider portion and subsequently sliding the insertion portion upward to place the head within the narrow portion, which prevents the bracket from being removed from the anchor plate 300. The brackets 304 may include a feature that retains the insertion portion within the narrow portion of the slot 302.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. An article rack comprising:
   a base mountable to a top rail of a truck box and including a pair of spaced apart first and second flanges;
   a linkage including a pair of opposing first and second sidewalls and a face extending between the sidewalls, wherein, at a first end of the linkage, the first and second sidewalls are pivotally connected to the first and second flanges, respectively, such that the linkage is disposed between the first and second flanges;
   first and second arms pivotally connected to the first and second sidewalls, respectively, at a second end of the linkage;
   a drive mechanism including a first wheel fixed to the first flange, a second wheel fixed to the first arm, an axle rotationally coupling the second wheel to the second arm, and an endless loop trained around the wheels such that pivoting of the linkage about the base pivots the arms about the linkage; and
   a carrier attached to the first and second arms.

2. The article rack of claim 1 further comprising an actuator arrangement configured to pivot the linkage about the base to move the carrier between a transporting position and a loading position.

3. The article rack of claim 2, wherein the carrier is folded over the linkage and seated on the face when in the transporting position.

4. The article rack of claim 2, wherein the actuator arrangement includes a spur gear fixed to the second sidewall, a pinion gear rotatably supported to the second flange and meshing with the spur gear, and a driveshaft fixed to the pinion gear.

5. The article rack of claim 4, wherein the base further includes a third flange spaced from the second flange in a longitudinal direction of the top rail, and wherein the actuator arrangement further includes a second pinion gear fixed to the driveshaft and rotatably supported by the third flange, a second spur gear rotatably supported by the third flange and meshing with the second pinion gear, and a hand crank operably coupled to the second pinion gear.

6. The article rack of claim 2, wherein the actuator arrangement further includes an electric motor operably coupled to the driveshaft.

7. The article rack of claim 4, wherein rotation of the driveshaft in a clockwise direction moves the carrier toward the loading position, and rotation of the driveshaft in a counterclockwise direction moves the carrier toward the transporting position.

8. The article rack of claim 1, wherein the carrier defines a channel configured to receive wheels of a bicycle.

9. The article rack of claim 1, wherein the first and second wheels are sprockets and the endless loop is a chain.

10. The article rack of claim 1, wherein the linkage further includes a second face opposite the face, and wherein the face, the second face, the first sidewall, and the second sidewall cooperate to define an interior, and the drive mechanism is disposed in the interior.

11. The article rack of claim 1 further comprising an anchor having a first end attached to the base and a second end configured to mount to an anchor plate formed on a sidewall of the truck box.

12. An article rack comprising:
    a lifting mechanism including:
       a base mountable to a top rail of a truck box and including a pair of spaced apart first and second flanges,
       an intermediary including a pair of opposing first and second sidewalls and a face extending between the sidewalls, wherein, at a first end of the intermediary, the first and second sidewalls are pivotally connected to the first and second flanges, respectively, such that the intermediary is disposed between the first and second flanges;

first and second arms pivotally connected to the first and second sidewalls, respectively, at a second end of the intermediary, and a drive mechanism having a first wheel fixed to the first flange, a second wheel fixed to the first arm, an axle rotationally coupling the second wheel to the second arm, and an endless loop trained around the wheels; and an article support attached to the first and second arms; wherein the lifting mechanism is movable between a transport position in which the arms are pivoted to be adjacent to the sidewalls and the article support is disposed on the first face, and a loading position in which the carrier is pivoted below the base.

13. The article rack of claim 12 further comprising an actuator arrangement configured to move the lifting mechanism between the transporting position and the loading position.

14. The article rack of claim 13, wherein the actuator arrangement includes a spur gear fixed to the second flange, a pinion gear rotatably supported to the second flange and meshing with the spur gear, and a driveshaft fixed to the pinion gear.

15. The article rack of claim 14, wherein the base further includes a third flange longitudinally spaced from the second flange, and wherein the actuator arrangement further includes a second pinion gear fixed to the driveshaft and rotatably supported by the third flange and a second spur gear rotatably supported by the third flange and meshing with the second pinion gear.

16. The article rack of claim 12 further comprising an actuator arrangement configured to move the lifting mechanism between the transporting position and the loading position, the actuator arrangement including a gear fixed to the intermediary and an electric motor operably coupled to the gear.

17. An article rack comprising:
a base mountable to a top rail of a truck box and including a pair of spaced apart first and second flanges;
a linkage including a pair of opposing first and second sidewalls and a support member extending between the sidewalls, wherein, at a first end of the linkage, the first and second sidewalls are pivotally connected to the first and second flanges, respectively;
first and second arms pivotally connected to the first and second sidewalls, respectively, at a second end of the linkage;
a drive mechanism including a first wheel fixed to the first flange, a second wheel fixed to the first arm, an axle rotationally coupling the second wheel to the second arm, and an endless loop trained around the wheels such that pivoting of the linkage about the base pivots the arms about the linkage; and
an article support attached to the first and second arms.

18. The bicycle rack of claim 17 further comprising an actuator arrangement configured to move the article support between a transporting position and a loading position.

19. The bicycle rack of claim 18, wherein the actuator arrangement includes a spur gear fixed to the second flange, a pinion gear rotatably supported to the second flange and meshing with the spur gear, and a driveshaft fixed to the pinion gear.

20. The article rack of claim 18, wherein the base further includes a third flange spaced from the second flange in a longitudinal direction of the top rail, and wherein the actuator arrangement further includes a second pinion gear fixed to the driveshaft and rotatably supported by the third flange and a second spur gear rotatably supported by the third flange and meshing with the second pinion gear.

* * * * *